United States Patent [19]

Kobayashi et al.

[11] Patent Number: 4,995,482
[45] Date of Patent: Feb. 26, 1991

[54] DISC BRAKE

[75] Inventors: Kinzo Kobayashi, Kanagawa; Shinichi Nakayama; Shigeo Suzuki, both of Yamanashi, all of Japan

[73] Assignee: Tokico Ltd., Kawasaki, Japan

[21] Appl. No.: 468,909

[22] Filed: Jan. 23, 1990

Related U.S. Application Data

[63] Continuation-in-part of Ser. No. 360,868, Jun. 2, 1989.

[30] Foreign Application Priority Data

Jun. 14, 1988 [JP] Japan .................................. 63-78529
Oct. 19, 1989 [JP] Japan ................................ 65-122565

[51] Int. Cl.$^5$ ............................................. F16D 65/847
[52] U.S. Cl. ................................ 188/73.1; 188/264 G
[58] Field of Search .................... 188/71.6, 73.1, 73.35, 188/264 AA, 264 R, 264 G

[56] References Cited

U.S. PATENT DOCUMENTS 4,401,012 8/1983 Emmett ........................... 188/264 G
4,603,760 8/1986 Myers .............................. 188/264 G
4,836,339 6/1989 Kobayashi et al. ................. 188/73.1

FOREIGN PATENT DOCUMENTS 2165902 4/1986 United Kingdom ........... 188/264 G

Primary Examiner—Duane A. Reger
Attorney, Agent, or Firm—Wenderoth, Lind & Ponack

[57] ABSTRACT

A disc brake comprising a carrier member, a disc, a pair of friction pads supported by the carrier and arranged to slide in the axial direction of the disc, one of the pads having a backing member, a caliper mounted to the carrier for straddling the disc and arranged to slide in the axial direction of the disc, the caliper having at least a cylinder portion, a piston mounted in the cylinder portion and arranged to slide in the axial direction of the disc, the piston facing one of the friction pads on the side thereof remote from the disc, a boot means for shielding the piston, a shim means disposed between the piston and the backing member, and a shielding plate formed integrally with the shim means and located between the disc and the boot means. The shielding plate includes a first portion axially extending from the shim toward the disc and a second portion radially outwardly extending from the extension of the first portion.

4 Claims, 4 Drawing Sheets

DISC BRAKE

This is a CIP Application of U.S. Ser. No. 07/360,868 filed on June 2 1989.

BACKGROUND OF THE INVENTION:

1. Field of the Invention

The present invention relates to an improvement in a disc brake for a vehicle.

2. Prior Art

Pads which are employed in disc brakes must endure high surface pressure, heavy loads and high temperatures, and are therefore formed by using materials that have high wear resistance and good heat resistance.

Accordingly, it has heretofore been common practice to employ asbestos-resin molded materials which are formed by employing asbestos as a basic material and mixing it with a binder resin and various kinds of friction adjusting materials. However, semimetallic and metallic materials utilizing metal wires as basic materials have recently been employed with a view to reducing dust pollution and lengthening the life of such pads.

Metallic pads formed by using semimetallic or metallic materials as basic materials suffer, however, from the following problems. Since the associated disc is also formed from a metallic material, when the disc and the pad come into contact with each other, sparks are generated. If these sparks adhere to the piston boot of the disc brake, the piston boot may be burnt and degraded, which will result in breakage.

In view of the above-described problems, proposals have been made to provide a disc brake in which a shim which is interposed between the backing plate of an inner pad and a piston is extended radially of the disc to form a shielding plate for the purpose of shielding the boot from sparks generated during the contact between the disc and the pads, which type of disc brake is disclosed in Japanese Utility Model Laid Open No. 63-49032 which corresponds to U.S. Pat. Ser. No. 082,357 filed on Aug. , 1987 now U.S. Pat. No. 4,836,339.

The prior art disc brake described above suffers, however, from the following problems.

The prior art disc brake having such a shielding plate must be designed with a clearance of a certain width between the shielding plate and the caliper. Namely, the shielding plate is displaced axially of the disc as the lining of the pad wears. In cases where the caliper is provided with portions having a drag or with stepped portions, therefore, the clearance mentioned above needs to be defined in such a way as to prevent the shielding plate from interfering with those portions when the shielding plate is displaced. Further, calipers are generally made by casting and it is difficult to make calipers with sufficient dimensional accuracy. Consequently it is also necessary to design the caliper and shielding plate with a clearance of a certain width defined therebetween in order to avoid the possibility of proper assembly thereof not being feasible.

In the prior art disc brake with a clearance between the caliper and the shielding plate mentioned above, sparks can pass through the clearance defined between the shielding plate and the caliper and fly toward the piston boot, so the shielding effect is insufficient.

Further there is a problem in that, when the brake is operated with a heavy load, namely, when the pad is pressed onto the disc with a great force, metal powder may be scraped off from the pad and catch fire, and the flames may enter the piston boot side over the shielding plate and hence burn the piston boot.

SUMMARY OF THE INVENTION

In view of the above-described problems of the prior art, it is a primary object of the present invention to provide a disc brake in which damage of the piston boot can be effectively prevented.

To this end, the present invention provides a disc brake having a carrier member, a disc, a pair of friction pads respectively disposed on each side of the disc, the friction pad being slidably supported by the carrier member to allow sliding in the axial direction of the disc, one of the friction pads having a backing member, a caliper straddling the disc and slidably mounted to the carrier to allow sliding in the axial direction of the disc, the caliper having at least a cylinder portion, a piston slidably mounted in the cylinder portion of the caliper to allow sliding in the axial direction of the disc, which piston faces one of the friction pads on the side thereof remote from said disc, a boot means shielding the piston, a shim means disposed between the piston and the backing member of said one of the friction pads, and a shielding plate formed integrally with the shim means and located between the disc and the boot means, the shielding plate having a first portion axially extending from the shim toward the disc and a second portion radially outwardly extending from the extension of the first portion.

In a disc brake provided with the structure described above, the shielding plate is located close to a place where the disc and the pads are pressed onto each other and where sparks or flames are generated. The shielding plate therefore acts to prevent the spreading of sparks and flames generated before they enter the piston boot side over the shielding plate.

Further, the shielding plate offers thermal insulation and serves to keep the temperature on the piston boot side relatively low. In addition, the distance between the shielding plate and the piston boot is longer since the shielding plate is located closer to the place where the disc and pad contact each other. Therefore, any sparks and flames which enter the piston boot side through the clearance between the shielding plate and the caliper are cooled down before they reach the piston boot.

Thus, the piston boot can be protected against burning and deterioration.

The other objects, features and advantages of the present invention will become more apparent from the following description of the preferred embodiments thereof, taken in conjunction with the accompanying drawings.

DESCRIPTION OF THE PREFERRED EMBODIMENTS

Figure 1:
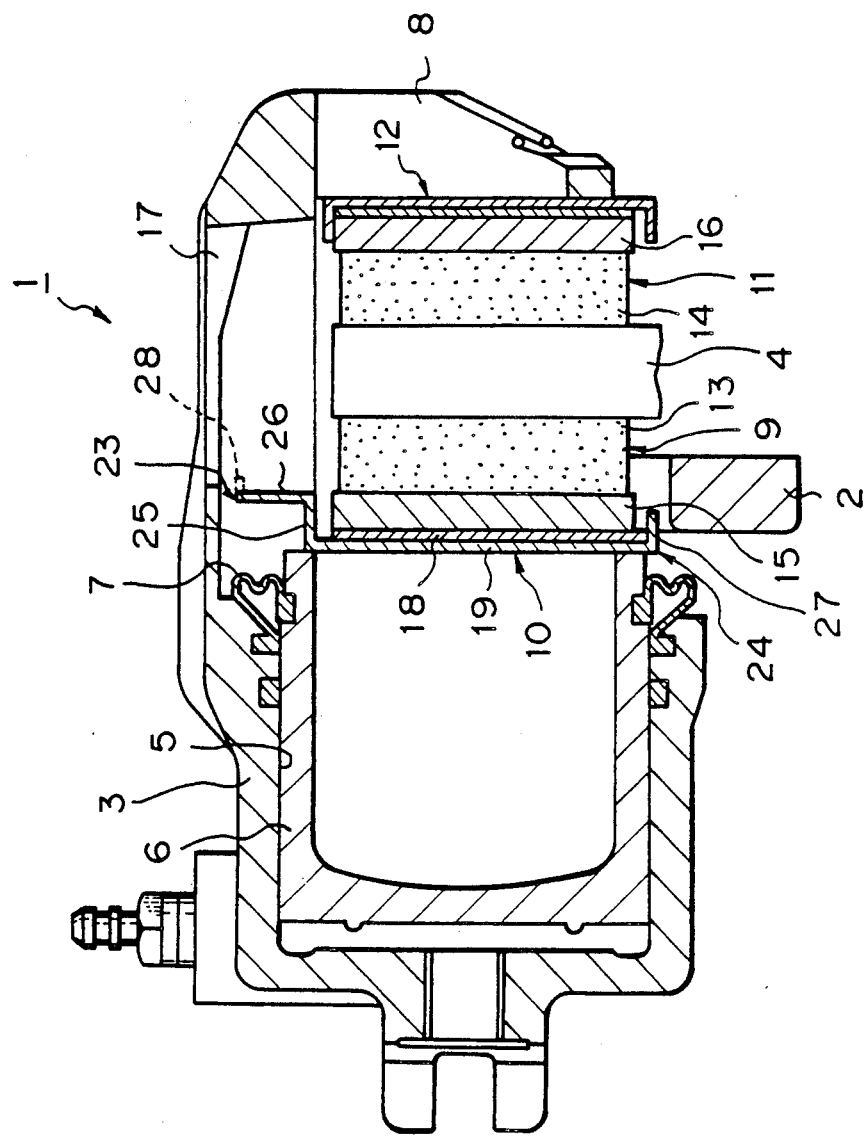
FIG. 1 is an elevational sectional view showing a disc brake according to a first embodiment of the present invention.

The preferred embodiments will be explained hereinunder in detail with reference to the accompanying drawings.

First, the constitution of a disc brake 1 according to a first embodiment will be explained with reference to FIG. 1. A carrier 2 is fixedly secured to a non-rotary member of a vehicle (not shown), and a caliper 3 is slidably mounted to the carrier 2 by means of caliper support pins (not shown) to allow sliding in the axial direction of a disc 4. A cylinder portion 5 is defined in the caliper 3, and a piston 6 is slidably mounted in the cylinder portion 5. Reference numeral 7 designates a piston boot for shielding the piston 6 and for protecting the area of sliding contact between the cylinder portion 5 and the piston 6 against the ingress of dust and water.

A bridge portion 8 is formed integrally with the caliper 3 in such a manner as to straddle a disc 4. The piston 6 is brought into contact with an inner pad 9 through a shim 10, while the bridge portion 8 of the caliper 3 is brought into contact with an outer pad 11 through a shim 12.

The inner and outer pads 9 and 11 consist of linings 13 and 14 and backing member 15 and 16, respectively. The shims 10 and 12 are attached to the backing members 15 and 16, respectively, in order to prevent the squeaking which would otherwise be caused by high-frequency vibrations generated at the area of contact between the disc and the pads 9, and 11 when the brakes are applied.

Shown at 17 is an opening formed through the caliper 3 to allow inspection of the linings 13 and 14 to check for wear.

In the disc brake with the constitution described above, when the piston 6 moves forward (rightward as viewed in FIG. 1), the caliper 3 moves in the reverse direction relative to the piston 6, so that the disc 4 is pressed from the opposite sides by the inner pad 9 and the outer pad 11 to generate braking force.

Next, the structure of the inner pad 9 will be explained with reference to FIGS. 2 and 3.

The shim 10 consists of an elastic shim member 18 and a cover shim member 19. The elastic shim member 18 is attached to the backing member 15 and has projections 20 projecting from the side thereof which is remote from the disc 4. The cover shim member 19 is provided with fitting bores 21 for receiving the projections 20, respectively, of the elastic shim member 18, and resilient leg portions 22 formed integrally therewith and disposed at both upper and lower ends of the cover shim member 19.

The cover shim member 19 is attached to the backing member 15 with the elastic shim member 18 sandwiched therebetween by clamping the backing member 15 between the upper and lower resilient leg portions 22.

On the upper and lower side of the cover shim member 19 are provided shielding plates 23 and 24, respectively, formed integrally with the cover shim member 19 and disposed such as to face respectively those portions of the piston boot 7 which are outside of the backing member 15.

The upper shielding plate 23 comprises a first or intermediate portion 25 extending axially of the disc 4 toward the disc 4 and a second or shielding portion 26 bent at a predetermined position to extend outward radially of the disc 4. The upper shielding plate 23 is configured with the outer end of the shielding portion 26 positioned such as to be in alignment with the peripheral edge of the opening 17 formed in the caliper before the lining becomes worn.

The lower shielding plate 24 is formed to extend in the radial direction of the disc 4 toward the inner portion of the disc 4 and has a bent portion 27 bent at the extension of the extending portion toward the disc 4. Operation of the disc brake provided with the constitution described above will now be explained.

Sparks and flames generated by virtue of the forced contact of the inner and outer pads 9, 11 with the disc 4 strike against the upper shielding plate 23 and are directed outwardly through the opening 17 of the caliper 3. Further, it is to be noted that any sparks and flames generated are suppressed before they spread extensively, since the shielding plate 23 is located near the position at which the disc 4 and the lining 13 of the inner pad 9 contact each other to generate such sparks and flames. There is thus a great reduction in the level of sparks and flames entering the piston boot 7 side through the clearance between the shielding plate 24 and the caliper.

Further, the temperature on the piston boot 7 side is kept relatively low by virtue of the thermal insulation provided by the shielding plate. In addition, the distance between the shielding plate 23 and the piston boot 7 is lengthened by an amount corresponding to the extent to which the shielding plate 23 is made to approach the position at which the disc 4 and the lining 13 of the inner pad 9 contact each other. Consequently, sparks and flames which have entered the piston boot 7 side through the clearance between the shielding plate 23 and the caliper 3 are sufficiently cooled down before they reach the piston boot.

As described above, in the disc brake according to the preferred embodiment, a great reduction in the amount of sparks and flames entering the piston boot 7 side over the shielding plate 23 is attained and, further, any sparks and flames which enter the piston boot 7 side are sufficiently cooled down on the piston boot side, thereby making it possible to protect the piston boot from burning and deterioration as a result of such sparks and flames.

In the preferred embodiment described above, the lower shielding plate 24 is formed so that only the end portion of the lower shielding plate 24 is bent in the same manner as in the prior art described above, since sparks and flames tend to fly outwardly in the radial direction of the disc due to the centrifugal force acting thereon. The lower shielding plate 24 may, however, be formed to have a similar configuration to that of the upper shielding plate 23.

Further, the upper shielding plate 23 may be provided with a third portion 28 which is bent at the outer end of the second or shielding portion and extends a small distance, for example 2 to 3 mm, as shown by the dotted line in FIG. 1. In cases where such a third portion is provided, it is possible to determine the degree of wear of the lining 13 by utilizing the position of the tip of the third portion as a reference. Thus, it can be easily determined when the pad 9 is due for replacement by glancing through the opening 17 of the caliper 3.

Next, a second embodiment of the present invention will be explained with reference to FIGS. 4 to 7.

The constitution of a disk brake 50 according to this embodiment is the same as that of the disc valve 1 of the first embodiment except for a shim 51 for an inner pad 9. The same reference numerals will therefore be used to designate elements which are the same as those of the first embodiment explained above and detailed explanation thereof will be omitted.

The shim 51 for the inner pad 9 consists of an elastic shim member 52 and a cover shim member 53. The elastic shim member 52 is attached to a backing member 15 of the member 15 of the inner pad 9 and has projections 54 projecting from the side thereof which is remote from a disc 4. The cover shim member 53 is provided with fitting bores 55 for receiving the projections 54, respectively, of the elastic shim member 52, and resilient leg portions 56 formed integrally therewith and disposed at both upper and lower ends of the cover shim member 53.

The cover shim member 53 is attached to the backing member 15 with the elastic shim member 52 sandwiched therebetween by clamping the backing member 15 between the upper and lower resilient leg portions 56.

On the upper and lower side of the cover shim member 53 is provided shielding plates 57 and 58, respectively, formed integrally with the cover shim member 53 and disposed such as to face respectively those portions of a piston boot 7 which are outside of the backing member 15.

The upper shielding plate 57 comprises a first or axially extending portion 59 extending axially of the disc 4 toward the disc 4, a second or shielding portion 60 bent at a predetermined position to extend outward radially of the disc 4, and a third or axial extension 61 which is bent at the outer end of the shielding portion 60 and extends axially of the disc 4 in the direction from the disc 4. The upper shielding plate 57 is configured with the outer end of the shielding portion 60 positioned such as to be in alignment with the peripheral edge of a opening 17 formed in a caliper 3 before linings 13, 14 become worn.

The lower shielding plate 58 is formed to extend in the radial direction of the disc 4 toward the inner portion of the disc 4 and has a bent portion 62 bent at the extension of the extending portion toward the disc 4.

Figure 2:
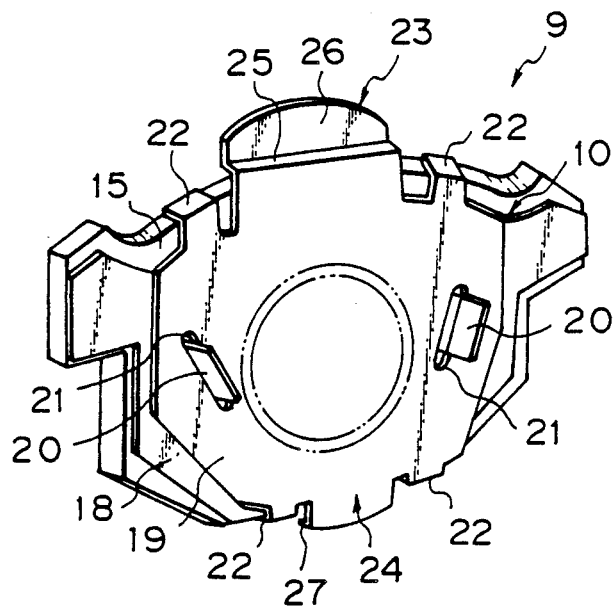
FIG. 2 is a perspective view showing the friction pad employed in the disc brake shown in FIG. 1.
Figure 3:
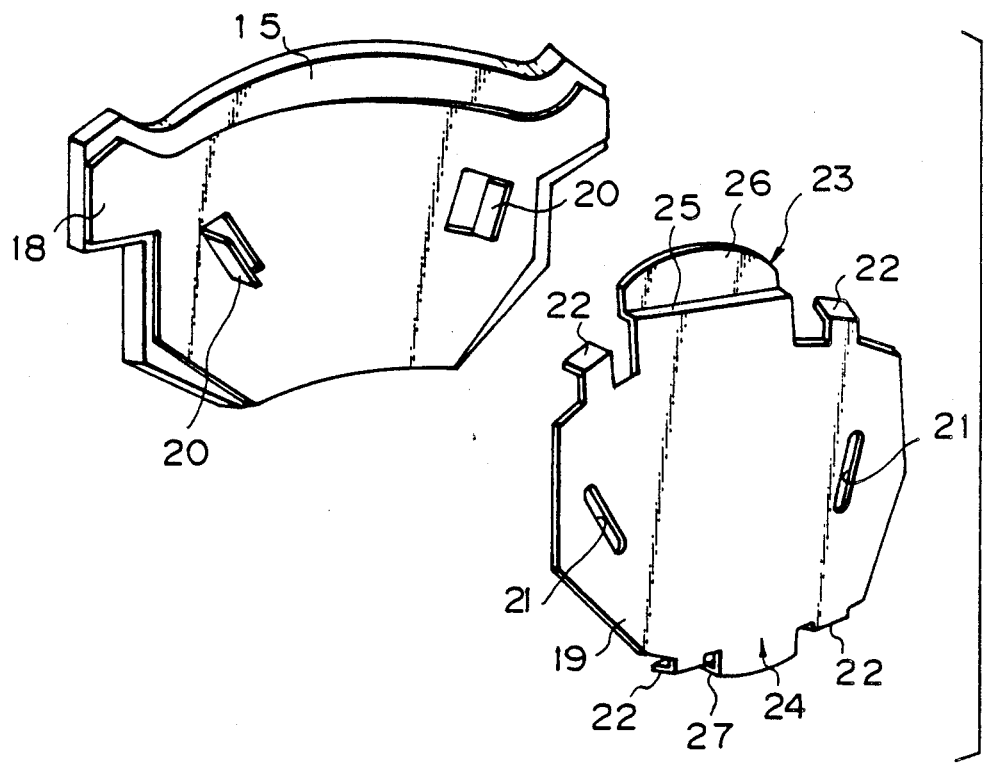
FIG. 3 is an exploded perspective view of the friction pad shown in FIG. 2.
Figure 4:
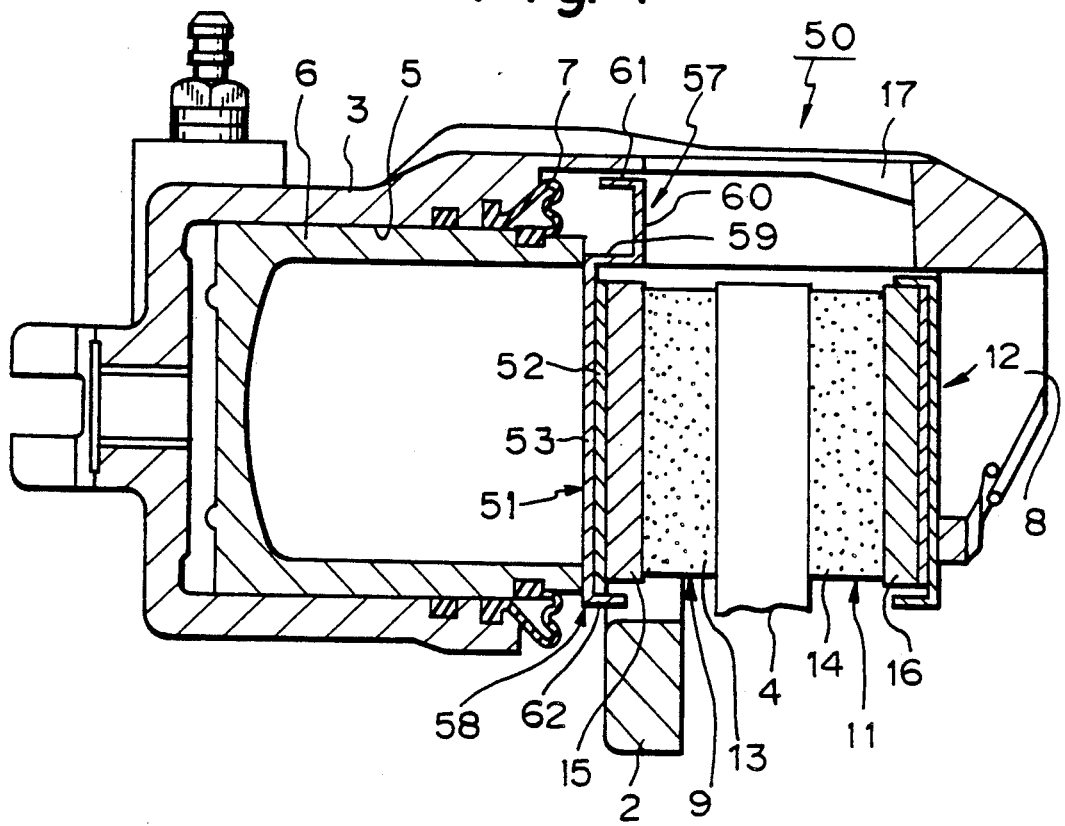
FIG. 4 is an elevational sectional view showing a disk brake according to a second embodiment of the present invention.
Figure 5:
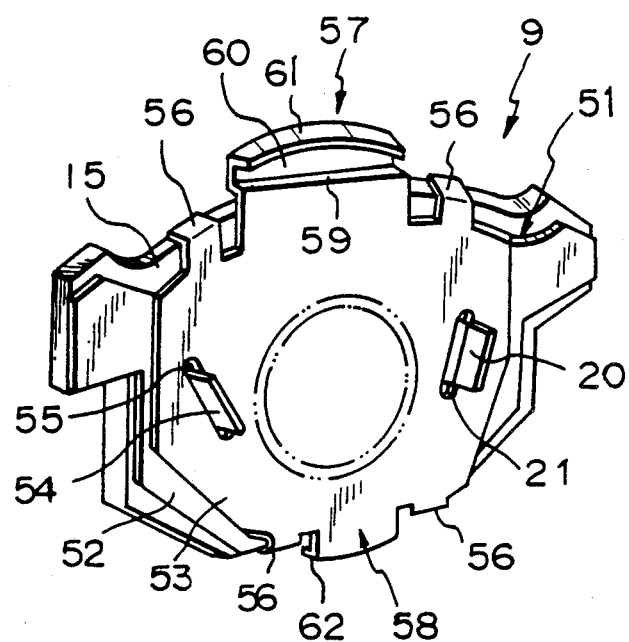
FIG. 5 is a perspective view showing the friction pad employed in the disc brake shown in FIG. 4.
Figure 6:
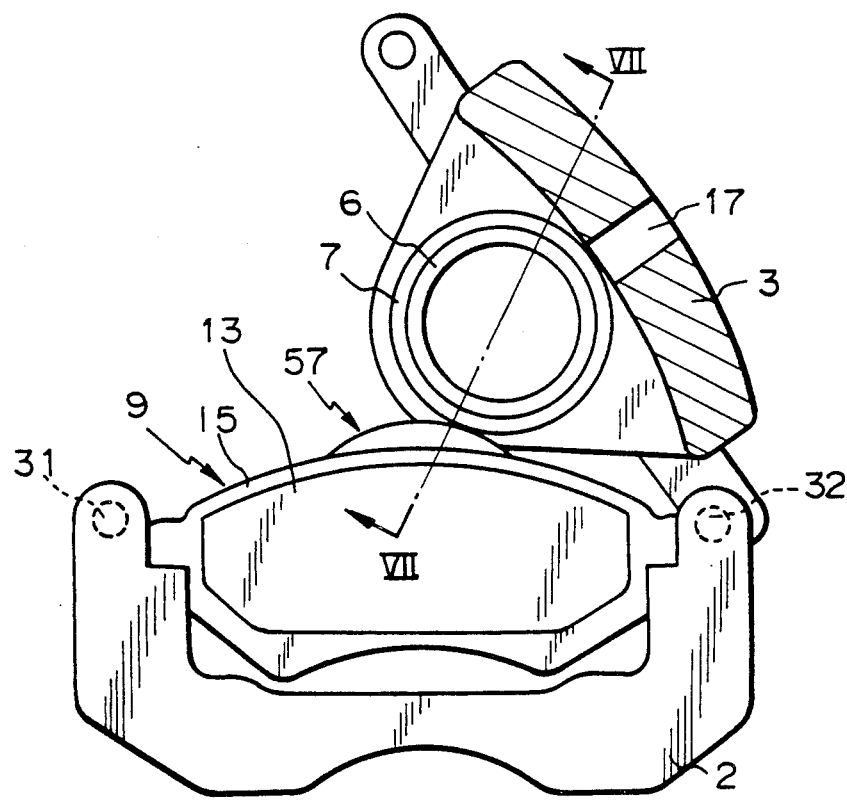
FIG. 6 shows the manner in which worn friction pads are replaced with new ones.

It should be noted that the upper shielding plate 57 effectively protects a piston boot 7 in the same manner as is the case of the upper shielding plate 26 in the first embodiment explained in reference to FIGS. 1 to 3.

In addition, the upper shielding plate 57 prevents the pistons boot 7 from being damaged when changing worn pads with new ones.

Figure 7:
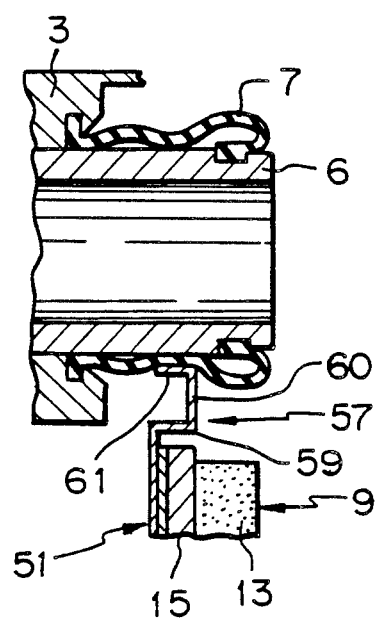
FIG. 7 is a sectional view taken along the line VII—VII in FIG. 6.

When changing worn pads 9 and 11 with new ones, one of a pair of caliper supporting pins 31 and 32 is disassembled and the caliper 3 is then rotated around the other of the pair of the supporting pins 31, 32 for removing the worn pads. At that time, the piston 6 is protruding from the cylinder 5 since the lining 5 of the inner pad 11 has been worn. In order to rotate and return the caliper 3 to a position for assembly, the piston 6 must be pushed back into the cylinder 5 in advance. However, a mechanic sometimes forgets to carry out such an operation. If he rotates the caliper 3 back without pushing the piston 6 back into the cylinder 5 in advance, the upper shielding plate 57 hits against the piston boot 7 as shown in FIG. 7, and may possibly damage the piston boot 7 if no means is employed for avoiding such damage. In the present embodiment, however, the upper shielding plate 57 is provided with the third axial extension 61 which is bent at the outer end of the shielding portion 60 and extends axially of the disc 4 in the direction away from the disc 4. Even if the upper shielding plate 57 hits against the piston boot 7, therefore, bearing pressure applied to the piston boot 7 is low and the damage to the piston boot 7 can be avoided, since the contacting surface area of the third or axial extension 61 is large. It should be noted that the third portion 28 shown by the dotted line in FIG. 1 can act to prevent damage to the piston boots 7. The third portion 28 may, however, inhibit the expulsion of sparks and flames through the opening 17. It should be noted that the third or axial extension 61 advantageously extends from the shielding portion 60 in the direction away from the disc 4, so that the axial extension 61 can be made longer, if desired, to substantially reduce the bearing pressure applied to the piston boot 7 when the shielding plate 57 hits against piston boot 7, without inhibiting the expulsion sparks and flames through the opening 17.

As described in detail hereinbefore, in the disc brake according to the present invention, a shielding plate for preventing deterioration of the piston boot due to sparks and flames generated when the friction pads are pressed onto the disc comprises a first or intermediate portion extending from the shim member toward the disc and a second or shielding portion extending outward radially of the disc from the end of the intermediate portion. It is therefore possible to reduce the amount of sparks and flames entering the piston boot side and also possible to cool any sparks and flames which enter the piston boot side, thereby reliably preventing deterioration of the boot.

Further, the shielding plate is formed integrally with the shim. This involves no increase in the number of parts of the disc brake, nor in the number of assembly steps, thus involving no increase in costs.

Although the present invention has been described through specific terms, it should be noted here that the described embodiments are not necessarily limitative and that various changes and modifications may be imparted thereto without departing from the scope of the invention which is limited solely by the appended claims.

What is claimed is:

1. A disc brake comprising:
   a carrier member;
   a disc;
   a pair of friction pads respectively disposed on each side of said disc,
   said friction pads slidably supported by said carrier member to allow sliding in the axial direction of the disc, one of said friction pads having a backing member;
   a caliper straddling the disc and slidably mounted to said carrier to allow sliding in the axial direction of the disc,
   said caliper having at least a cylinder portion;
   a piston slidably mounted in said cylinder portion of said caliper to allow sliding in the axial direction of the disc,
   said piston facing said one of said friction pads at the side thereof remote from said disc;
   a boot means for shielding a sliding contact area defined between said piston and said cylinder portion;

a shim means disposed between said piston and said backing member of said one of said friction pads; and a shielding plate formed integrally with said shim means and located between said disc and said boot means, said shielding plate having a first portion axially extending from said shim toward said disc and a second portion radially outwardly extending from the extension of said first portion.

2. A disc brake as claimed in claim 1, wherein said caliper is provided with an inspection hole formed therein at the portion which opposes the outer circumferential surface of said disc, and wherein said second portion of said shielding plate is located to be adjacent to the peripheral edge of said through hole.

3. A disc brake as claimed in claim 1, wherein said shim means comprises an elastic shim member and a cover shim, and wherein said shielding plate is formed integrally with said over shim.

4. A disc brake as claimed in claim 1, wherein said shielding plate further includes a third portion extending from the outer end of the second portion axially of the disc in the direction away from the disc.

* * * * *